Patented Aug. 20, 1929.

1,724,945

UNITED STATES PATENT OFFICE.

HIRAM S LUKENS, OF PHILADELPHIA, PENNSYLVANIA, ASSIGNOR TO SOLIDON PRODUCTS, INC., OF PHILADELPHIA, PENNSYLVANIA, A CORPORATION OF PENNSYLVANIA.

SOREL-CEMENT PRODUCT AND METHOD OF MAKING THE SAME.

REISSUED

No Drawing.   Application filed June 30, 1926. Serial No. 119,756.

My invention relates to the making of Sorel cement products with or without the use of aggregates and is especially adapted to such composition when used for under floorings, under coatings or primers for the preparation of floors, walls or surfaces to be covered with either fabricated materials or coatings, such as paints, lacquers, etc. It is, however, adapted for general use.

The main feature of the invention lies in making such Sorel cement products or coatings more water resistant as well as to prevent or overcome certain objectionable features.

Sorel cement products as ordinarily made are subject to a number of objections which greatly hamper their application and usefulness. The main objections are disintegration or reduction in strength by water or moisture, blooming, and warping.

Such objections are especially applicable to the use of Sorel cement products for surfacing floors, such as cement floors, to which linoleum, rubber products, or other floor coverings are to be cemented; and also to the use of Sorel cement products as plaster or wall coverings to which wall paper or other fabricated coverings are to be applied or which are coated with oil or water paints, lacquers, etc. In fact, such objections have substantially prevented the commercial use of Sorel cement products for such locations.

My invention overcomes these difficulties and moreover, enables the coverings or coatings to be applied much sooner than in the case, for example, of Portland cement, which requires a long delay for drying before applying such coverings or coatings.

After long experimentation upon the introduction of emulsions or suspensions of water resistant materials in the Sorel cement mixture, I have found a method by which the above mentioned difficulties may be overcome and permanent water resistant properties imparted to Sorel cement products, as well as greatly hastening the time of drying before coatings or coverings are applied. This result is obtained by observing the following conditions:

1. The water repellant substance should be stable and unaltered by atmospheric agencies of all kinds or by the constituents of the Sorel cement mixture.

2. The emulsion or suspension of the water repellant agent should be precipitated, "cracked" or flocculated in place and such cracking or flocculating should be irreversible and should yield no by-products that are altered by atmospheric agencies or are soluble in or softened by water or that react unfavorably with the Sorel cement constituents.

3. The precipitation, cracking or flucculation of the emulsion or suspension should be brought about at the time of making the Sorel cement mixture, mortar or plastic mass preceding its pouring or other means of application.

As an example of water repellant materials conforming to the first condition, I will mention the petroleum hydrocarbons of the paraffin series. I do not, however, desire to limit myself to the use of such materials, but may use other materials which remain stable and unaltered under the conditions of use, and are capable of being brought into the form of an emulsion or colloidal suspension.

As regards the second condition, I would point out that, if the cracking, precipitating or flocculating material remains as a constituent of the composition, the reforming of an emulsion or suspension is prevented, if the substance be subsequently subjected to the action of water or moisture. Hence, it is desirable to use some normal constituent of the cement or binder as a cracking agent. Where this is not possible, I prefer to add to the mixture, prior to bringing in contact with the emulsion a suitable cracking agent which will act to crack or flocculate the emulsion and yet will yield no by-products of an objectionable character, such as are formed in the use of soaps of fatty acids in connection with Portland cement, as above referred to. I do not intend, however, to limit myself to any particular cracking or flocculating agent, so long as the agents used will form no deleterious by-product nor introduce materials which tend to weaken the composition or contribute to water absorption or disintegration by the action of water.

In carrying out my invention in connection with a material or binder of a general Sorel cement type with or without aggregate, I introduce into the mixture, for example, an appropriate amount of an emulsion containing a water repellant agent, such as an emulsion of oil and water. Some cheap petroleums contain natural emulsifying agents (such as certain sulphonic acids or their derivatives), and these may be mixed up directly with the water; or an oil may be made into an emulsion with a solid, such as talc, as for example, in a grinding mill; or the water repellant material, such as oil, may be dispersed in water by means of aluminum hydroxide; or the water repellant material, such as oil, may be dispersed in a liquid suspension wholly by mechanical agencies, as by a suitable colloid mill. In this case, the magnesium chloride of the Sorel cement mixture will act to crack the emulsion in place without the formation of any deleterious by-product. For example, I have prepared a dry mixture of:

|  | Parts. |
|---|---|
| Standard 20–30 mesh Ottawa sand | 5 |
| Silex (120 mesh) | 2 |
| Plastic calcined magnesite | 1 |
| Magnesium chloride with 6 parts of water of crystallization | 1 |

I then prepared an emulsion of oil by agitating with water an oil containing natural emulsifying agents. Such oils are well known in the trade and are common in petroleum fractions from certain districts. The oil is usually in the ratio of about one part of oil to nine parts of water, although this ratio may be widely varied. This emulsion was then added to the dry mixture above described to an amount sufficient to form a paste or mortar and the mixing continued until the magnesium chloride passed into solution. As the magnesium chloride dissolved, the oil particles dispersed through the liquid constituent tended to separate and effectually wet or coat the solid particles. These oil particles had little or no effect in decreasing the Sorel reaction of the magnesium chloride with the magnesium oxide. This is shown by the fact that the addition of the emulsion did not materially affect the strength of the resultant material. The water formed in cracking evaporates.

Products thus produced lose but 10% to 20% of their tensile strength on exposure to water, while when ordinary Sorel cement is used, the decrease in strength is much greater and more rapid.

It will be noted that in the above example the cracking agent formed a part of the binder, but I may add a cracking agent such as any well known electrolyte, in cases where the binder is of such a nature that this is needed in order to effectuate the cracking of the water repellant emulsion.

I am aware that the alkaline earth salts of the sulphonic acids are in general soluble, but on leaching products prepared in the manner described with water, no sulphonate of the alkaline earth is dissolved. For this reason, I infer that some compound other than a soluble sulphonate of an alkaline earth is produced and that this compound is substantially insoluble in water.

The water repellant material used in my emulsion or suspension may be of organic, inorganic, or mixed type so long as the same complies with the above requirements. The emulsion or suspension may be prepared in any desirable manner so long as the above conditions are complied with. For example, from 1% to 3% of a suitable water repellant material such as paraffin wax may be brought into a highly dispersed condition in water by treatment in a colloid mill or dispersed through the medium of a colloid such as specially prepared zinc hydroxide (as by dialyzing). The water repellant agent may be ground with a solid such as talc and with water in a suitable trituration apparatus, such as a colloid mill. The emulsion should be cracked without chemical change of the water resistant materials and preferably by the action of the excess magnesium chloride of the Sorel cement. With any emulsion where it is not possible to crack without chemical change I crack in such a way as to produce by-products, all of the non-volatile portions of which are water repellant.

I may employ water resistant materials, such as cellulose nitrate or cellulose nitrate in conjunction with suitable solvents. If a solvent is used, the nitrate solution may be dispersed by means of appropriate emulsifying agents. Natural and artificial waxes, bitumens, and certain clays will all yield favorable results under appropriate conditions. In all cases, in order to obtain my improved results, the suspension of water repellant material should not contain material which materially weakens the article and must be cracked in place. Furthermore, there must be no deleterious by-products set up in the cracking operation, and the cracking must be of such a nature that the precipitation effected thereby is irreversible in the presence of water.

The materials above recited will act as water repellant agents in the final article, which agents are stable under the conditions of use, the cracking also being irreversible.

When my improved process is applied to Sorel cement products the products show a marked improvement in resistance to disintegration or being effected by water or moisture, the blooming or growth of surface incrustations is eliminated, and by proper application warping may be greatly reduced or entirely eliminated. Blooming in Sorel cement products is probably due to an actual transfer of excess magnesium salts to or toward the surface through the medium of excess water which is either not dried out of the product or has been taken up by hygroscopic action from moist atmosphere. The presence of the waterproofing material applied as above set forth probably causes impervious barriers in the material which hinder or entirely prevent transfer of moisture or salts, thus preventing blooming. The reducing or stoppage of warping is also probably due to prevention of transfer of water or moisture through the article.

When my improved water resistant Sorel cement material is used for plaster, it will usually be sufficiently dry within forty-eight hours to be coated with paint, lacquer, wall paper or other covering. Similarly, when used as a surface for under flooring or as an under coat or base, floors, linoleum, rubber tile or flooring may be attached to it by a suitable binder or cement after a period of only two or three days after applying the plastic flooring. Moreover, no disintegration of the glue, paste or cementing material is observed as has been the case with such under floors heretofore.

Such Sorel cement products have a wide field of use since a quick setting cement material is provided which loses its moisture within a short time, yields a product free from objectionable strongly alkaline properties, has exceptional structural strength, is fireproof, does not disintegrate with time, does not destroy color pigments admixed with or applied to it, and does not react injuriously with paints, lacquers, pastes, glues, cements and the like which may be applied in contact with it. Such Sorel cement articles are not only highly water resistant but have the strength generally required in building materials and avoid or greatly reduce blooming or warping of such plastics.

By the terms "Sorel cement" in my claims I intend to cover the general Sorel cement type of binder; and by the term "emulsion" I intend to cover a finely divided suspension of the water repellant material which is preferably in the form of a colloidal suspension whether liquid or pasty. The emulsion may be prepared either from a solid or a solution of a solid, such for example, as an emulsion prepared from a solution of paraffin and benzol which may be formed into an emulsion or colloidal suspension when added to water. The cracking or flocculating may be carried out either by constituents of a Sorel cement or by an added cracking agent; provided the above conditions are complied with.

I claim:

1. In the manufacture of Sorel cement compositions, the steps consisting of adding thereto an emulsion of a water resistant stable material of a character which does not materially affect the chemical reaction between the magnesium oxide and the magnesium chloride, cracking the water resistant ingredient within the Sorel cement mixture by means of a cracking agent, and producing a water repellant Sorel cement article.

2. In the manufacture of Sorel cement compositions, the steps consisting of mixing an aggregate with a binder of the Sorel cement type, incorporating in the mixture an emulsion containing a water resistant stable constituent of a character which does not materially affect the chemical reaction between the magnesium oxide and the magnesium chloride, and cracking the emulsion in the Sorel cement mixture by means of a cracking agent.

3. In the manufacture of Sorel cement compositions, the steps consisting of adding thereto an emulsion of a water resistant stable material of a character which does not materially affect the chemical reaction between the magnesium oxide and the magnesium chloride, cracking the water resistant ingredient within the Sorel cement mixture by means of a cracking agent, and producing a water repellant article in which all of the non-volatile products of cracking are water resistant and stable.

4. In the manufacture of Sorel cement compositions, the steps consisting of forming a Sorel cement composition and also containing an emulsion of a water resistant stable material of a character which does not materially affect the chemical reaction between the magnesium, oxide and the magnesium chloride, and cracking the emulsion of the water resistant constituent by an element of the Sorel cement mixture while producing cracked products, all the non-volatile portions of which are water resistant and stable.

5. As a new article of manufacture, a Sorel cement compostion containing the cracked water resistant stable constituents of an emulsion, said constituents being of a character which does not materially affect the chemical reaction between the magnesium oxide and the magnesium chloride.

6. As a new article of manufacture, a Sorel cement composition containing the cracked water resistant stable constituents of an emulsion said constituents being of a character which does not materially affect the chemical reaction between the magnesium oxide and the magnesium chloride, all of the non-volatile portions of which are water repellant and stable.

7. As a new article of manufacture, aggregates cemented together by a binder of the Sorel cement type and containing the cracked water resistant stable constituents of an emulsion said constituents being of a character which does not materially affect the chemical reaction between the magnesium oxide and the magnesium chloride.

8. As a new article of manufacture, a continuous layer for a building wall or floor formed of a Sorel cement mixture containing the cracked water resistant stable constituents of an emulsion and adapted to serve as a base for another coating or covering said constituents being of a character which does not materially affect the chemical reaction between the magnesium oxide and the magnesium chloride.

In testimony whereof I have hereunto set my hand.

HIRAM S. LUKENS.